US007151530B2

(12) United States Patent
Roeber et al.

(10) Patent No.: US 7,151,530 B2
(45) Date of Patent: Dec. 19, 2006

(54) SYSTEM AND METHOD FOR DETERMINING AN INPUT SELECTED BY A USER THROUGH A VIRTUAL INTERFACE

(75) Inventors: Helena Roeber, Palo Alto, CA (US); Ilhami Torunoglu, Monte Sereno, CA (US); Abbas Rafii, Palo Alto, CA (US)

(73) Assignee: Canesta, Inc., Sunnyvale, CA (US)

( * ) Notice: Subject to any disclaimer, the term of this patent is extended or adjusted under 35 U.S.C. 154(b) by 714 days.

(21) Appl. No.: 10/645,765

(22) Filed: Aug. 20, 2003

(65) Prior Publication Data

US 2004/0136564 A1 Jul. 15, 2004

Related U.S. Application Data

(60) Provisional application No. 60/405,054, filed on Aug. 20, 2002.

(51) Int. Cl.
G09G 5/00 (2006.01)
(52) U.S. Cl. ............. 345/168; 345/158; 345/170; 341/21; 382/100
(58) Field of Classification Search ........ 345/156–158, 345/168–170; 341/21–23; 382/100, 106
See application file for complete search history.

(56) References Cited

U.S. PATENT DOCUMENTS

| 3,610,754 | A | 10/1971 | Pirlet |
| 3,857,022 | A | 12/1974 | Rebane et al. |
| 4,187,492 | A | 2/1980 | Delignieres |
| 4,294,544 | A | 10/1981 | Altschuler et al. |
| 4,312,053 | A | 1/1982 | Lipsky |
| 4,333,170 | A | 6/1982 | Mathews et al. |
| 4,376,301 | A | 3/1983 | Roberts |
| 4,541,722 | A | 9/1985 | Jenks |
| 4,686,655 | A | 8/1987 | Hyatt |
| 4,688,933 | A | 8/1987 | Lapeyre |
| 4,716,542 | A | 12/1987 | Peltz et al. |
| 4,956,824 | A | 9/1990 | Sindeband et al. |
| 4,980,870 | A | 12/1990 | Spivey et al. |

(Continued)

FOREIGN PATENT DOCUMENTS

GB 1073503 A 6/1967

(Continued)

OTHER PUBLICATIONS

Naoshi Matsuo et al., "Speaker Position Detection System Using Audio-visual Information," Dec. 1999, XP 000931599, pp. 214-220.

(Continued)

*Primary Examiner*—Richard Hjerpe
*Assistant Examiner*—Kimnhung Nguyen
(74) *Attorney, Agent, or Firm*—Shemwell Mahamedi LLP

(57) ABSTRACT

A system and method for determining which key value in a set of key values is to be assigned as a current key value as a result an object intersecting a region where a virtual interface is provided. The virtual interface may enable selection of individual key values in the set. The position is determined using a depth sensor that determines a depth of the position in relation to the location of the depth sensor. A set of previous key values that are pertinent to the current key value may also be identified. In addition, at least one of either a displacement characteristic of the object, or a shape characteristic of the object is determined. A probability is determined that indicates the current key value is a particular one or more of the key values in the set.

20 Claims, 8 Drawing Sheets

U.S. PATENT DOCUMENTS

| | | |
|---|---|---|
| 4,986,662 A | 1/1991 | Bures |
| 5,003,166 A | 3/1991 | Girod |
| 5,056,791 A | 10/1991 | Poillon et al. |
| 5,099,456 A | 3/1992 | Wells |
| 5,102,223 A | 4/1992 | Uesugi et al. |
| 5,166,905 A | 11/1992 | Currie |
| 5,174,759 A | 12/1992 | Preston et al. |
| 5,381,235 A | 1/1995 | Inoue et al. |
| 5,442,573 A | 8/1995 | Bredberg et al. |
| 5,573,077 A | 11/1996 | Knowles |
| 5,617,371 A | 4/1997 | Williams |
| 5,733,031 A | 3/1998 | Lin |
| 5,802,208 A | 9/1998 | Podilchuck et al. |
| 5,825,033 A | 10/1998 | Barrett et al. |
| 5,835,616 A | 11/1998 | Lobo et al. |
| 5,842,194 A | 11/1998 | Arbuckle |
| 5,969,822 A | 10/1999 | Fright et al. |
| 5,983,147 A | 11/1999 | Krumm |
| 6,002,435 A | 12/1999 | Yamamoto et al. |
| 6,005,958 A | 12/1999 | Farmer et al. |
| 6,075,605 A | 6/2000 | Futamura et al. |
| 6,108,437 A | 8/2000 | Lin |
| 6,111,517 A | 8/2000 | Atick et al. |
| 6,137,896 A | 10/2000 | Chang et al. |
| 6,188,777 B1 | 2/2001 | Darrell et al. |
| 6,266,048 B1 | 7/2001 | Carau, Sr. |
| 6,281,878 B1 | 8/2001 | Montellese |
| 6,325,414 B1 | 12/2001 | Breed et al. |
| 6,412,813 B1 | 7/2002 | Breed et al. |
| 6,421,042 B1 | 7/2002 | Omura et al. |
| 6,422,595 B1 | 7/2002 | Breed et al. |
| 6,463,163 B1 | 10/2002 | Kresch |
| 6,480,616 B1 | 11/2002 | Hata et al. |
| 6,512,838 B1* | 1/2003 | Rafii et al. .................. 382/106 |
| 6,614,422 B1 | 9/2003 | Rafii et al. |
| 6,650,318 B1 | 11/2003 | Arnon |
| 6,674,895 B1* | 1/2004 | Rafii et al. .................. 382/154 |
| 6,690,357 B1 | 2/2004 | Dunton et al. |
| 6,710,770 B1 | 3/2004 | Tomasi et al. |
| 6,734,879 B1 | 5/2004 | Hasha et al. |
| 6,791,700 B1 | 9/2004 | Omura et al. |
| 6,801,662 B1 | 10/2004 | Owechko et al. |
| 6,956,506 B1* | 10/2005 | Mantyjarvi et al. ............ 341/22 |
| 6,961,443 B1 | 11/2005 | Mahbub |
| 7,084,857 B1* | 8/2006 | Lieberman et al. .......... 345/168 |
| 2001/0043719 A1 | 11/2001 | Harakawa et al. |
| 2002/0006807 A1* | 1/2002 | Mantyjarvi et al. ......... 455/550 |
| 2002/0024676 A1 | 2/2002 | Fukuzaki |
| 2002/0140949 A1 | 10/2002 | Sasaki et al. |
| 2003/0048930 A1 | 3/2003 | Mihara et al. |
| 2003/0076484 A1* | 4/2003 | Barnji et al. .................. 356/5.1 |
| 2004/0153229 A1 | 8/2004 | Gokturk et al. |

FOREIGN PATENT DOCUMENTS

| | | |
|---|---|---|
| WO | WO 84/00427 A1 | 2/1984 |
| WO | WO 00/19705 A1 | 4/2000 |
| WO | WO 00/21024 A1 | 4/2000 |
| WO | WO 02/21502 A1 | 3/2002 |

OTHER PUBLICATIONS

IBM Corp., "Virtual Keyboard" ISB Tech Disclosure Bulletin, Mar. 1990, vol. 32, No. 10B, XP 000097915, pp. 359-360.

A.E. Savakis et al., "Restoration of Real Defocused Images Using Blur Models Based on Geometrical and Diffraction Optics," 1991, IEEE, pp. 919-922.

Ren C. Luo et al., "Defocusing Blur Restoration in Natural Scene Images for Factual Analysis," Nov. 15, 1993, IEEE, pp. 1377-1381.

"Sonar," encyclopedia article from Wikipedia (electronic publication, no date).

* cited by examiner

SYSTEM AND METHOD FOR DETERMINING AN INPUT SELECTED BY A USER THROUGH A VIRTUAL INTERFACE

RELATED APPLICATIONS

This application claims priority to U.S. Patent Application No. 60/405,054, entitled "Improving Usability on Touch Screen Keyboards and Projected Keyboards Using Sound Cues and Lexicographic Information," filed Aug. 20 2002, the aforementioned application being hereby incorporated by reference.

TECHNICAL FIELD

The disclosed embodiments relate generally to the field of virtual interfaces for electronic devices. More particularly, the disclosed embodiments relate to a system and method for determining an input selected by a user through a virtual interface.

BACKGROUND

Mechanical keyboards are popular input mechanisms for many processing devices. But in the realm of small electronic devices such as cell phones and personal digital assistants (PDAs), the size of mechanical keyboards is a serious limitation. To accommodate small electronic devices, past attempts at providing a mechanical keyboard have included shrinking the keyboard size and making the keyboard an attachable accessory.

More recently, digital keyboards have been employed for use with PDAs and similar devices. A digital keyboard is an image of a keyboard displayed on a contact-sensitive screen. Such keyboards are typically operable by a user that directs a stylus into contact with the contact-sensitive screen. The user selects keys from the keyboard by using the stylus to contact the keyboard in areas where specific keys of the keyboard are displayed.

One problem encountered with digital keyboards is that the users typically miss the center of the key that they wish to select. Often, the area that is contacted is a region shared by two keys. Because digital keyboards offer no tactile feedback for key selection, the user is often unaware that the area being contacted on the contact-sensitive area is in between keys. Furthermore, digital keyboards offer no tactile resistance, so that even if the user could tell that they selected an area in between keys, the user cannot physically force the actuation of one key over another key. Thus, the key that the user actually selects may not be the key that the user intended to select.

One approach that has been presented in dealing with the problem of ambiguous key selection for digital keyboards is to use a language-based algorithm to determine which key a user intended to select. A language-based algorithm looks at a sequence of selected keys and determines if one of the keys was mistakenly entered. If a mistake is detected, a correction may be made that replaces the key determined as being a mistake. For example, the language-based model may replace successive entries of the digital keyboard corresponding to "tge" with "the".

Light-generated keyboards are recent innovations. Such keyboards project the image of a keyboard onto a table top or other surface. As with digital keyboards, light-generated keyboards typically provide no tactile feedback or resistance to the user. Thus, the user has little ability to detect when a key selection was ambiguous or otherwise off-center. Should the user select an area in between keys, the user cannot physically manipulate the selection of one key over another, as is the case with traditional mechanical keyboards.

Figure 1:
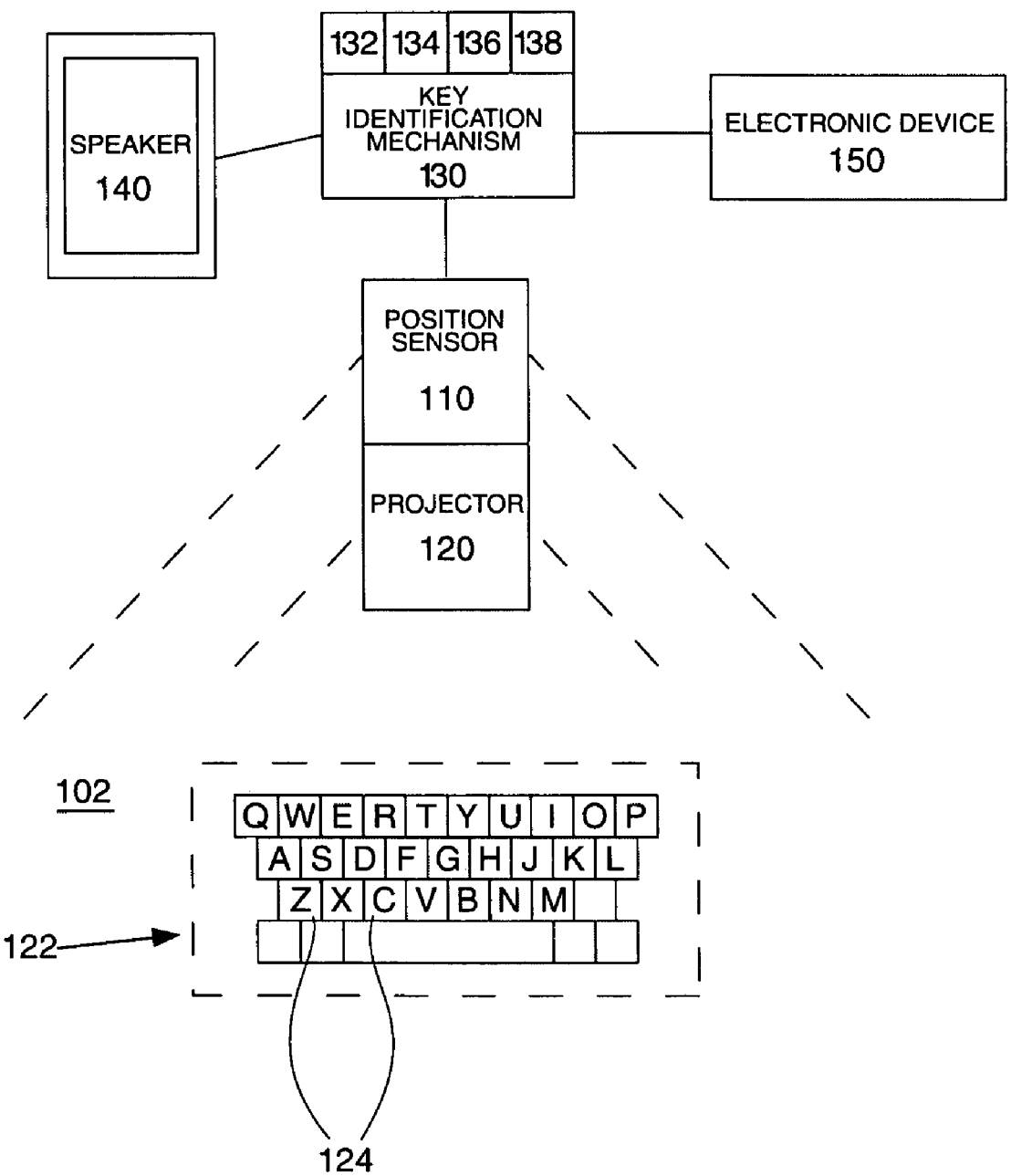
FIG. 1 illustrates a virtual interface system that uses position information and other types of information to determine a particular key value that corresponds to an object intersecting a surface upon which the virtual interface is provided

In the drawings, the same reference numbers identify identical or substantially similar elements or acts. To easily identify the discussion of any particular element or act, the most significant digit or digits in a reference number refer to the Figure number in which that element is first introduced. Any modifications necessary to the Figures can be readily made by one skilled in the relevant art based on the detailed description provided herein.

DETAILED DESCRIPTION

Overview

An embodiment provides for determining which key value in a set of key values is to be assigned as a current key value as a result an object intersecting a region where a virtual interface is provided. The virtual interface may enable selection of individual key values in the set. In one embodiment, a position of where the object intersects the region is determined. The position is determined using a depth sensor that determines a depth of the position in relation to the location of the depth sensor. A set of previous key values that are pertinent to the current key value may also be identified. In addition, at least one of either a displacement characteristic of the object, or a shape characteristic of the object is determined. A probability is determined that indicates the current key value is a particular one or more of the key values in the set. The probability is indicated based on the position, the set of one or more past key values, and either one or both of the displacement characteristic and/or the shape characteristic.

As used herein, the term "virtual interface" means a system by which sensors sense, without use of physical connections, an object interaction with a region of the virtual interface, and where the sensed interaction is then translated into data, particularly input data. The virtual interface may be provided on the region in the form of a set of keys, such as a keyboard.

Embodiments of the invention may be implemented to reduce or eliminate ambiguous entries made through use of a virtual keyboard or similar interfaces. As will be described, embodiments of the invention detect an interaction with a virtual interface. The interaction with the virtual interface may be of the form of an object, such as a stylus or finger, intersecting a region upon which designated areas are assigned to specific key values. The specific key value assigned to the object may correspond to which designated area of the region the object is determined to intersect or interact with. Embodiments such as described herein obtain information that includes one or more of the following types of information: (i) position information of where the object intersected the region of the virtual interface, (ii) previous or historic key values assigned to previous interactions of the object with the region, (iii) a shape of the object, and (iv) a displacement characteristic of the object. This information is used to determine a likelihood that a particular key code or set of key codes are candidates for being the selected key code.

As such, embodiments of the invention do not rely on one set parameter to determine which key code was selected. For example, position information alone may yield an ambiguous result if the position is near or at the boundary of two or more designated areas of the region delineating key values of the virtual interface. To be clear, the position itself may not necessarily be ambiguous, rather the nature of the virtual interface is such that the user may miss the particular key that is the target for the selection, or make unintentional key strokes. Embodiments of the invention minimize such ambiguities by using other information to determine which key value is most likely the key value selected by the user.

In an embodiment, a combination of two or more of the different types of information described above is used to indicate, for each one of the key codes in the set, a probability that the particular key code was the one selected by the object's intersection with the region of the virtual interface. Thus, for example, in an embodiment where the set of key values of the virtual interface corresponds to alphabetic keys arranged in a QWERTY layout, the object intersecting the region (referred to as a "key strike") will yield a smaller set of keys that could be the key selected by the user. In a typical case, one key would be the most probable key selected by the user. The different types of information for determining which key was selected may be weighted in a formula such that when the position information yields a center of a key, the affects from the other types of information may be minimized in the weighted formula. Thus, in such cases where the key stroke is centered, an embodiment provides that only one type of information is used to determine which key was selected. In situations where the position information is off-center with respect to a particular key, an embodiment provides that the combination of information types are weighted such that the other information types become more determinative as to which key or keys was the key that was most likely intended to be selected.

While information such as the position of the object intersecting the region can be determined unambiguously for a particular key stroke, in certain cases, the key value assigned to the key stroke may be ambiguous. Specifically, there may be ambiguity in determining which key value is to be assigned to a current key strike when the key-strike is off-center relative to one of the designated areas of the virtual interface that delineates a key value. There may also be ambiguity as to whether the user intended to make a selection, despite an object intersecting the region. For example, a particular key strike may be accidental or unintentional.

According to an embodiment, the virtual interface is in the form of a keyboard or key device. The virtual interface has no physical presence, thus it can provide no tactile feedback to a user who uses it. The user is not able to feel the keys for crevices or other indications of where to place his fingers. Furthermore, no physical restraints are provided with the virtual interface, thus the user has no opportunity to physically manipulate the selection of one key over the other before the contacted key is registered. The result is that use of virtual keyboards and other key pads are more prone to receiving entries which are ambiguous as to the key being selected (i.e. key strike is in between two keys), and as to whether the key strike was intention (i.e. object falls on region where virtual keyboard is provided).

In order to overcome the lack of physical presence when key selection is made, embodiments of the invention provide that when a key strike is detected for a virtual keyboard, the identification of the key strike is determined by a combination of independent processes. The combination of processes may include one or more of the following: determining the position of where the key strike occurred, one or more recent key values, the shape of the object, and a displacement characteristic of the object. In addition, an embodiment provides that what is determined is a probability, for each key in the keyboard, that the particular key is the key value corresponding to the key strike. Thus, such embodiments avoid situations presented by past solutions, where for example, there is a determination of the key value followed by a correction of the key value based on the determination of some other processes. Rather, embodiments of the invention perform all of the processes at once before determining probabilities of what key values may correspond to the key strike. In one embodiment, the probabilities are the output, and another electronic device determines what the value corresponding to the most recent key strike is based on the probabilities provided.

System Description

FIG. 1 illustrates a virtual interface system that uses position information and other types of information to determine a particular key value that corresponds to an object intersecting a surface upon which the virtual interface is provided. A system such as shown by FIG. 1 includes a depth-perceptive position sensor 110, a projector 120, and a mechanism 130 for identifying keys. In one embodiment, a speaker 140 is coupled to the key identification mechanism 130.

In an embodiment such as shown by FIG. 1, a combination of the depth-perceptive position sensor 110 and the projector 120 form the virtual interface. The projector 120 provides visible delineations of designated areas on a surface of the virtual interface in order guide the user in interacting with the virtual interface. The position sensor 110 obtains position information of the object's interaction, where the object's interaction is guided by an image provided by projector 110. The position sensor 110 approximates or otherwise obtains coordinates of the key stroke which may correspond to where the object struck surface 102. The manner in which position sensor 110 operates is described in greater detail with FIG. 8. The coordinates include one coordinate that is based on a depth-wise distance between where the object made contact with the surface 102 and the sensor 110. This position information may be mapped onto a template in order to determine key values that correspond to the position of the object. Various ways of implementing the depth-perceptive position sensor 110 are described with FIG. 8.

In one embodiment, the image provided by the projector 120 matches the template used for the virtual interface. For example, projector 120 may display a QWERTY style keyboard 122 on surface 102, where designated regions of the surface are shown as keys 124 of the keyboard. When an object contacts the surface 102, the key value assigned to the object's contact will correspond to the particular key shown in the area where or near where the object made contact.

The projector 120 may cast the image of the particular virtual input device onto the surface 102. The projector 120 only informs the user of the template of the virtual interface. In this sense, it is an optional component, as there are other ways to inform the user of the template. For example, a surface design of a keyboard on surface 102 may provide the user with the indication of the template for the virtual interface. It is also possible to not show the template. For example, it may be possible to rely on the user's knowledge of the template, or on some visual cue, rather than a complete display of the template of the virtual interface. The surface 102 is monitored by the position sensor 110 or other optical sensing device.

In an embodiment such as shown by FIG. 1, the projection created by projector 120 may be of a keyboard 122, having keys 124 arranged in a QWERTY layout. Alternatively, projector 120 may create another type of alphanumeric keypad, a numeric pad, a musical keypad or other arrangement in which a set of keys are replicated in the form of an image. As another example, keyboard 122 may include keys corresponding to an Arabic alphabet. The keyboard 122 may also replicate a piano or other musical keyboard, in which the keys are arranged in the same manner that a corresponding musical arrangement is formed. For example, keyboard 122 may be formed of piano keys, rather than alphanumeric keys. For purpose of description, embodiments of the invention will be described with reference to a QWERTY style keyboard, although it will be understood that other models of keyboard, key pads, sets of keys, or discrete input devices may be substituted for the keyboard.

The key identification mechanism 130 processes position information provided by the position sensor 110 to determine the likelihood that one or more key values correspond to a current key strike. Since the position information may be correlated to key values through use of a template or other mapping scheme, any interaction between the object and the surface 102 corresponding to where keyboard 122 is displayed, may be interpreted as one or more key values by the key identification mechanism 130. In one embodiment, position information 110 provides information or raw data in the form of pixels arrays or values. The key identification mechanism 130 may conduct a pixel analysis on each pixel array captured by position sensor 110 in order to determine a position of where the object intersected surface 102. In one embodiment, the position information may be approximated, at least in part by, a depth of the object relative to the position sensor 110 or other reference point. An angle, or other lateral coordinate may also be used as a coordinate of the object's position. It is also possible for a displacement of the object off of the surface 102 to be determined by the pixel analysis.

Figure 8:
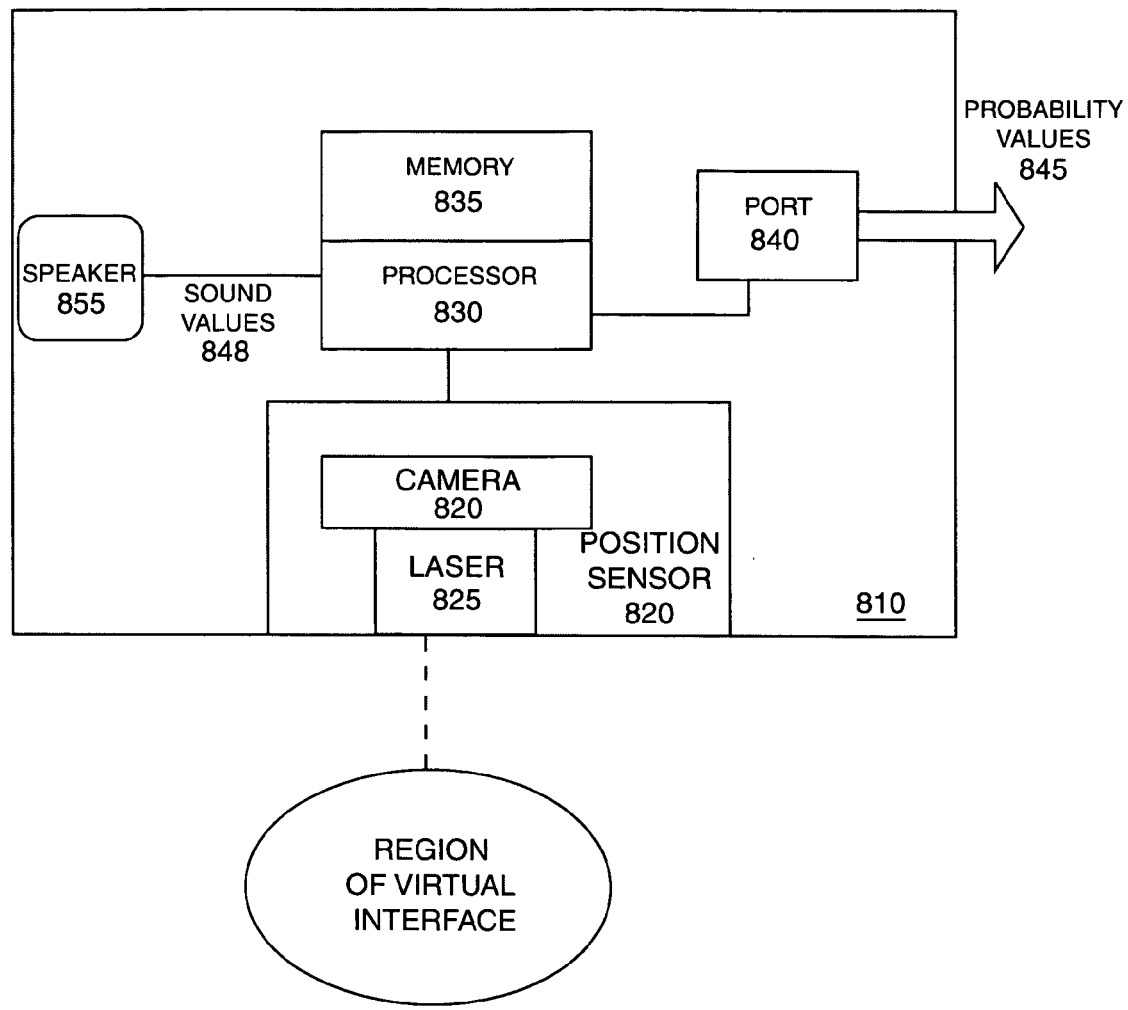
FIG. 8 illustrates a hardware diagram of a system upon which an embodiment of the invention may be implemented.

The key identification mechanism 130 may be provided as a program or set of instructions that are executable by a processor (see FIG. 8). In addition, key identification mechanism 130 may include memory. In combination, the key identification mechanism 130 may identify which key in a set of possible keys corresponds to the object contacting a particular region of surface 102. As will be described, the position of the object on the surface 102 is used in identifying which key in the set of keys represented by keyboard 122 is selected in response to the key strike (where the object contacts surface 102). But as will be described, other information may also be used to determine a probability indication that a particular key is the key that was struck by the user, or at least intended to be struck. In this way, the probability indication overcomes much of the ambiguity that can come with using virtual interfaces, even when accurate position information of where interactions with the virtual interface occur. Furthermore, embodiments of the invention can indicate or determine that certain interactions are not valid, corresponding to, for example, when such interactions are not intentionally entered. For example, the user may linger the object over a position, or inadvertently drop a pen instead of a stylus. In embodiments such as described herein, a probability indication may be determined as to the likelihood that the object making contact with the surface 102 is intended input. Such probability indications may be highest in the case of the falling pen/stylus, or lingering object, as examples.

Specific components of key identification mechanism 130 include a position determination module 132, a shape identification module 134, and a displacement module 136 The position determination module 132 approximates a position of the object when the object intersects the surface 102, using position information or data from the position sensor 110. Such data or information may be in the form of pixel values or arrays. The position of the object may include a depth coordinate. For example, the coordinate of the object may include a depth value and an angle from a reference point or origin.

The shape identification module 134 determines what kind of object contacts the surface 102, as well as the orientation of the object when the object contacts the surface. For example, the shape identification module 134 may delineate between a finger and a stylus. The shape identification module 134 may also determine that the object was a finger tip pointed downward, as opposed to a finger pointed horizontally. The former could mean, for example, that the finger was headed downward, towards a particular key, so that the contacted key was intentional and at least proximate to the intended key. The shape identification module 134 may also delineate when an object is not a finger or stylus. Further examples and description of how the shape identification module 134 operates are provided elsewhere in this application.

Te displacement module 136 identifies a displacement characteristic of the object as the object makes contact with the surface 102. In one embodiment, the displacement characteristic corresponds to how high the object is above surface 102 at a particular instance just before or after the object makes contact with surface 102. Further examples and description of how the displacement module 136 operates are provided elsewhere in this application.

In one embodiment, key identification mechanism 130 includes a historical determinative module 138. The historical determinative module 138 uses past key values to provide probabilities as what a current key value is. In particular, the historical determinative module 138 uses recent past key values to determine what a probability, for each key value in the set, that the particular key is the selected current key value. For example, in the case of alphabetic characters, the historical determinative module 138 uses language tools to guess which key in the alphabet the user intended to select. For example, a language model may be used that anticipates or predicts the probability that a string of characters is valid. The language model 138 may be either probability based or semantically based. When probability based, the language model 138 determines the probability that one character would follow another character, at least in the context of the English language (or other language). The semantic based model determines what strings of characters are more likely to belong to one another. The historical determinative module 138 uses past identified input values to predict the next value. For example, if two consecutive input values are determined as "t" and "h", this module may provide an output that favors the next character as being an "e".

In other applications, such as music, the key stroke may correspond to musical notes. The historical determinative module 138 may, for example, assign probabilities for each key value being a current key value based on a known song or rift.

For each input detected by key identification mechanism 130, one embodiment provides that each of the modules process the input and provide an output as to the probability that one or more of the keys 122 in the keyboard are the key that is intended for selection. Thus, position determination module 132 use the approximation or determination of the relative position of where the object made contact with the surface 102 in relation to the designated areas that delineate each key value in the keyboard 122 in order to determine the probability indication for each of the key values. For example, if the position determined by position determination module 132 is between the letters "a" and "s" on a QWERTY keyboard, the probability indication outputted by this module would be highest for "a" and "s", and lowest for "p".

In an embodiment, the mechanism and the modules described above reside on a processor 830 (FIG. 8) as software, a program or other executable code. The mechanisms and modules may also reside on more than one processor. Memory resources may store the software, program or executable code. An electronic device 150 may be coupled to the key identification mechanism 130. The electronic device 150 may receive input values that are generated by the key identification mechanism in response to interactions with the keyboard 122, which may be in the form of an object contacting the surface 102. Examples of electronic device 150 include a handheld computer, such as a PDA or smart phone, or a laptop computer.

In one embodiment, key identification mechanism 130 identifies a set of possible input values for each discrete interaction of the object with the keyboard 122. The key identification mechanism 130 also provides a probability indication to each possible input value. In one implementation, all possible key values in keyboard 122 are assigned a probability indication, and the probability indications are output by key identification mechanism 130 to the electronic device 150. A processor (not shown) or other component of electronic device 150 may translate the output of the key identification mechanism 130 into one or more input values. The shape identification module 134 may determine the shape of the object intersecting the key to determine the probability indication that a particular set of keys were intended to be selected. For example, if the shape identification object recognizes the intersecting object as a downward moving finger, the probability indication for the keys near where the object strikes the surface 102 is highest, while if the shape identification is that of a horizontally pointed finger, the indication may favor that the finger was still moving to a new key on the keyboard when it inadvertently struck the surface 102. The shape identification module 134 may be used to provide indications as to which key was intended to be selected, as well as that the contact of the object with the surface was intended to cause an input.

According to an embodiment, key identification mechanism 130 receives combines data from position determination module 132, shape identification module 134, displacement module 136, and language model determinative module 138. A statistical model is implemented to weight and combine the various outputs of each module. The result is that a set of values are outputted rom key identification mechanism 130 to the electronic device 150. In addition, feedback data may be provided to the key identification mechanism 130. In one embodiment, the feedback data corresponds to data that is outputted after combining data from the various modules. In another embodiment, a final selected key value (such as determined by electronic device 150) may correspond to the feedback data.

Basic Methodologies

Figure 2:
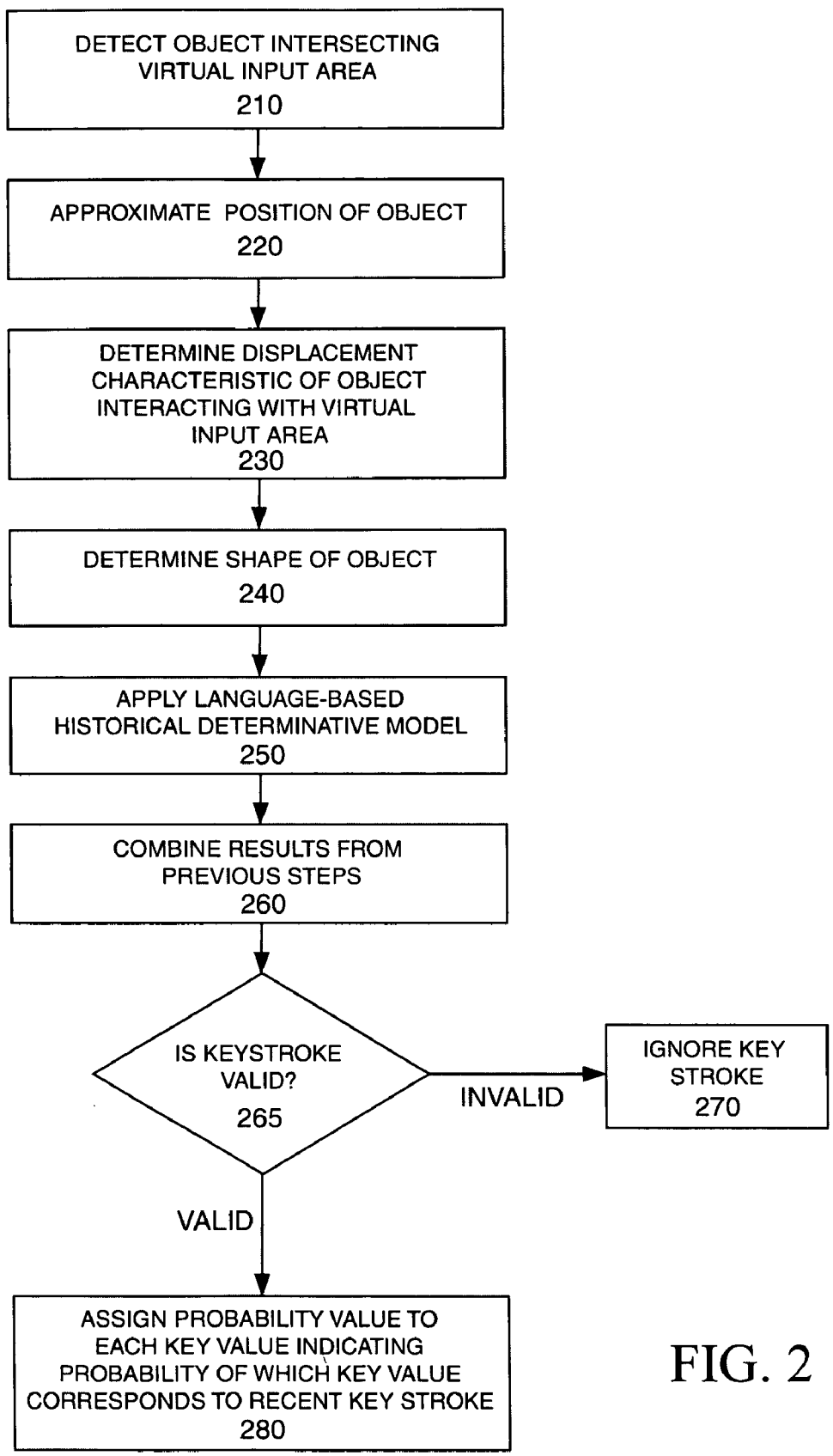
FIG. 2 illustrates a method for indicating the probability that a particular key entry into a virtual keyboard device is correct, under an embodiment of the invention.

FIG. 2 illustrates a method for indicating the probability that a particular key entry into a virtual keyboard device is correct, under an embodiment of the invention. A method such as described with FIG. 2 may be implemented using components such as described in FIG. 1. Thus, reference to elements of FIG. 1 is made to illustrate suitable components or elements for an embodiment of the invention. For purpose of discussion and with reference to embodiments described with FIG. 2 and elsewhere, the virtual interface is referred to as a virtual input area. The virtual input area may correspond to the region just above and on the surface 102 where keyboard 122 is displayed.

Step 210 provides that an object is detected when the object intersects the virtual input area. The detection may be made in part by position sensor 110, which repetitively captures images of virtual input area. As will be described, the position sensor 110 may include a camera that captures images in the form of a pixel array. In one embodiment, when a sufficient number of pixels in the camera's pixel arrays indicate the presence of an object, the object is detected.

Step 220 provides that the position of the object in the virtual input area is approximated. In one embodiment, one output of performing this step is a probability value for individual key values of the keyboard 122 being the corresponding key value of the most recent key stroke. Thus, when the key stroke is between keys or near a border, the probability values indicate a set of two or more key values that are potentially affected. In addition, position information may indicate whether a particular key stroke is valid. For example, the size of the object detected as intersecting the monitored region may be too large for a finger or stylus. In such case, an output of performing this step may be a low probability value as to the validity of the key stroke. The outputs of performing this step may be based entirely on the position information.

In one embodiment, step 220 may be performed by the depth-perceptive position sensor 110. As mentioned previously, one embodiment provides that the coordinate includes depth relative to the position sensor 110 or some other reference point, and an angle about a centerline of the line of sight for the position sensor 110. In an embodiment, steps 210 and 220 may be performed concurrently, or as part of the same process or calculation.

Steps 230–250 include independent processes that may be performed in addition to step 220 in order to determine probability values that each key value of the keyboard 122 is the current key value of a particular key strike. As will be described, a combination of the processes in step 230–250 may be performed in conjunction with determining the position information for the key strike in order to reduce ambiguity in determining key values or unintentional key strokes. Therefore, in one embodiment, steps 230–250 are performed, regardless of the outcome of steps 220.

In step 230, a displacement characteristic of the object interacting with the virtual interface is determined. In one embodiment, the displacement characteristic corresponds to how far above the surface 102 the object is positioned at a particular moment in time, either just before or just after the key stroke. In combination with determining the object's interaction with surface 102, the displacement characteristic may determine, for example, the nature of the object's movement as the key strike was made. For example, the displacement characteristic may indicate how vertical the object was moving when it made contact, or how quickly it moved from the time the displacement characteristic was observed until the time the key strike was detected or made. Such characteristics indicate how certain a user was in making the key selection. For example, a vertically displaced object just before the key strike is detected may indicate the user was actively using the keyboard, while a horizontally moving slow object may indicate an object that is lingering. In the latter case, the key strike is more likely to be unintentional. As such, an output of this step may be a probability value of each key value in the keyboard 122 being the current key value corresponding to a key strike. In addition, another output of this step may be a probability value that a particular key strike is valid (i.e. hovering finger may be determined as being more likely to be invalid). As with step 220, this step may be based entirely on the displacement characteristic.

In step 240, the shape of the object that intersects the surface of the virtual input area is determined and compared to known shapes. For example, if the shape of the object matches a finger or stylus, it may be deemed as more likely that the object's intersection was intentional. Furthermore, the shape of an object may affect determination of key selection as well. For example, a stylus point may be weighted as a more accurate key selection than a finger tip. And if the object was unrecognizable, or of another shape (such as when the user rests the elbow on the surface 102 where the virtual interface is provided), it may be deemed less likely that the object was intentionally placed on surface 102 to select keys 124. Determining the shape of an object intersecting the virtual input area is described in greater detail below, and in following sections.

Step 250 provides that a language-based historical determinative model is used to predict which keys 124 correspond to the likely key value for a particular key strike. The language based determinative model corresponds to a technique where recent past key values are used to determine a current key value, where the history of key values is processed in the context of the English language. As with other steps, performance of this process is independent of other processes. Probability values may be generated indicating likely key values based on past key values. It is also possible to determine probability values that the key strike is valid. For example, a string of four consonants in adjacent locations on the keyboard may be ignored as unintentional. A more detailed description of such processes is provided in greater detail below, and in following sections.

In one embodiment, steps 230–250 are performed simultaneously or concurrently. While the performance of each of steps 230–250 is preferable independent, it may be the case that steps 230–250 are part of the same process. In addition, steps 210 and 220 may be performed as simultaneous or concurrent steps with steps 230–250. The order presented with performing each of the recited steps is also arbitrary.

Step 260 provides that results of step 220–250 are combined based on some algorithm or formula. In one embodiment, the formula for combining the results of step 220–250 is heuristic. As such, an output of each of steps 220–250 is probability values that indicate, based on performance of that particular step, the likelihood that each key value in the keyboard 122 is the current key value in response to a key strike. The combining of the various probabilities determined as an output in each of the steps 220–250 may be in the form of an average, or weighted average. In this way, each image or a group of images (for example, as obtained by the position sensor 110) may be treated as a probability space that uses heuristics to determine the validity of a key stroke and its properties. Additionally, within an image a heuristic changes its thresholds and properties taking into consideration lens distortion and other system factors. Each of the heuristics is weighted. Each heuristic provides the algorithm with a value that represents a confidence rating for its measured property. Finally, the heuristics are combined in a single result.

Step 265 uses results obtained from step 260 to indicate a probability that the most recent key strike is valid. For example, the determination may exclude key strokes which have relatively high probability values of being invalid (such as from lingering fingers and large objects such as elbows being dropped on surface 102) from being considered as valid input. If the determination in step 265 is that the keystroke was invalid, step 270 provides that the particular keystroke is ignored. Otherwise, if the keystroke is valid, step 280 provides that the probability values determined in step 260 are outputted. The probability values may be outputted to another process, processor, or electronic device which interprets the probability values and selects a key stroke. For example, in the most basic interpretation, the key stroke may be interpreted as the key stroke that step 260 indicates is most likely. As a slightly more complex interpretation, the key stroke may be interpreted as the key value that only one of the processes determines with 100% certainty as being the correct key value, irrespective of combining the various probability values. In one embodiment, a probability indication is assigned to each key 124 indicating, for each key, the probability that particular key was the intended target. This probability value may range from 0% to 100% and in between.

An embodiment such as described in FIG. 2 utilizes four independent processes to determine the probability of what key values may correspond to a recent key stroke. However, other embodiments may use only two of the processes. Thus, steps 220–250 should be considered optional variations, in that not all of the steps are needed to determine the probability of key values. For example, in one embodiment recited with FIG. 3, only two processes, corresponding to variations of steps 220 and 250 are performed.

Furthermore, while an embodiment such as described with FIG. 2 illustrates an intermediate step of determining key validity, it should also be recognized that these steps (steps 265 and 270) is also optional. For example, one embodiment may recognize all objects that interact with the virtual interface as objects for entering key strokes, similar to the case of a mechanical keyboard that does not distinguish between objects striking its key.

Figure 3:
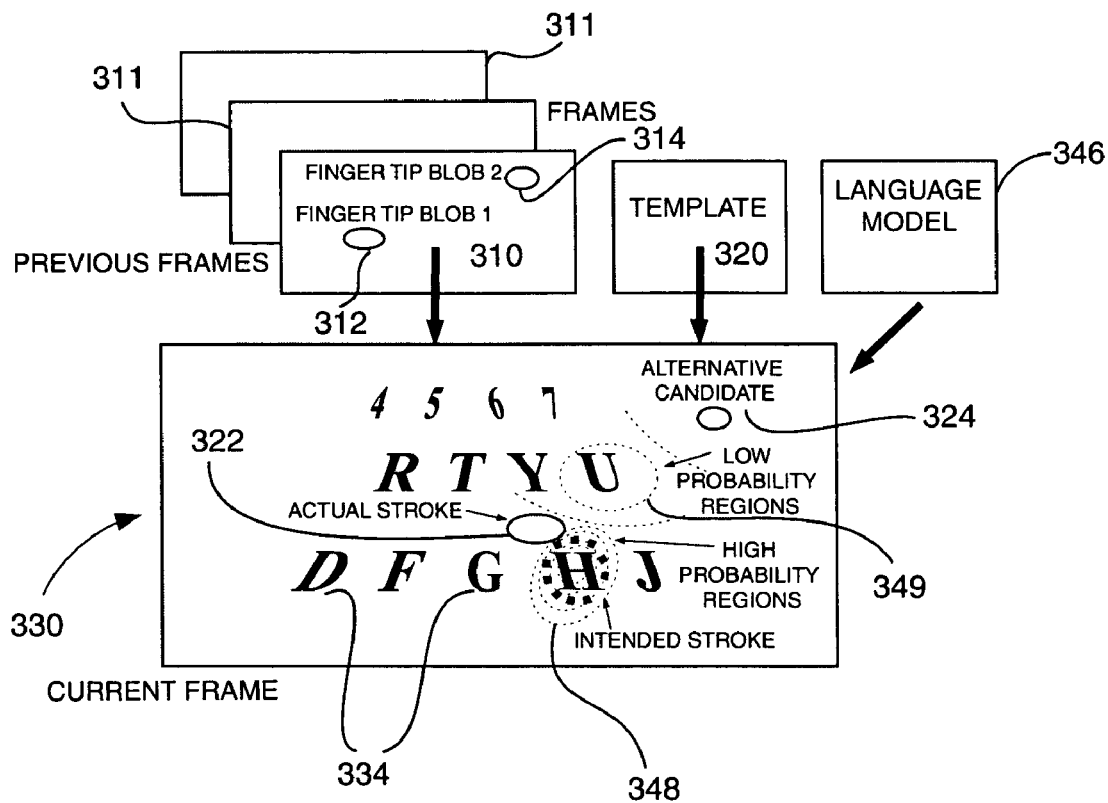
FIG. 3 is a diagram illustrating a system that uses multiple independent processes to assign a key value to a corresponding key stroke.

FIG. 3 is a diagram illustrating a system that uses multiple independent processes to assign a key value to a corresponding key stroke. A depth sensor image 310 is captured on an array of pixels, where each pixel has an intensity value. The depth sensor image 310 corresponds to one frame, captured at one instant of time. When implemented, a series of frames 311 may be obtained. Pixels used in capturing the image have different intensity values than surrounding pixels. In FIG. 3, the oval shapes are clusters of lit pixels constituting blobs 312, 314 representing user fingertips (or stylus tip). In the consecutive frames leading to the current frame of FIG. 3, each blob 312, 314 appears as clusters of lit pixels that probably grow in size (shown at top left of the figure). FIG. 3 shows two candidate blobs 312, 314.

In an embodiment such as shown, the virtual input device includes a template 320 and a projection 330 of the template. The projection 330 provides individual keys 334. Using the knowledge of template 320, projection 330 shows the presumed location of the virtual input device keys 334. The location information of the input keys 334 can be obtained during calibration of the depth-sensor used to capture depth sensor image 310. The distortion of the input keys 334 locations can be attributed to a lens effect from the depth sensor, but determination of which key 334 corresponds to the most recent key strike is invariant to the distortion effect.

In FIG. 3, the locations of different letters including letters D, F, G, H, J, etc. are shown. How the blobs 312, 314 map to template values is shown by ellipses 322 and 324. As shown, the ellipses 322, 324 are not direct hits on a particular key value. In such instances, probability values assigned to all of the keys (including keys closest to the blobs—the letter H and G) may be determined to indicate which key value is the best candidate for a current key strike. A probability space may be defined over the keys 334. The probability space may be based on the outcome of two or more independent processes (such as described with FIG. 2) for determining location of the key strike.

In FIG. 3, a language model process 346 is used in conjunction with a process in which position information (including depth) is obtained for the object interacting with the virtual interface. The language model process 346 may correspond to one variation of a historical determinative model, such as described in step 240 of FIG. 2. The language model process 346 calculates probabilities of certain key values based on past key values, in the context of lexicographic information, such as described below. This may be based on words, or syllables or other markers of the particular language employed.

In an embodiment, the lexicographic information and the position information (as well as other information obtained from other processes) may be used in combination to define a probability space over the image. The probability space includes values between 0–1. The probability space varies over time but not necessarily at each frame. In varies over time because the language model process 346 uses historical values. Thus, the probability space may vary as the user enters a text, perhaps every couple of frames while each keystroke is detected. The probability space is plotted by contour lines 348 showing, in the example of FIG. 3, the areas of highest probability around the letter H and near the left blob. Another probability contour 349 around the right blob 314 is non-zero but not as high as in the neighborhood of the left blob 312. An algorithm such as described with FIG. 2 determines which of the blobs 312, 314 is the more likely to represent an actual intended keystroke. In this case the left blob 312 is selected because it is in the neighborhood of the high probability values. The cluster of very high probability region around the letter H serves as another piece of useful information. It is used to determine the location of the blob had the user hit the center of letter H correctly. An oval shape with broken edges shows this corrected blob location.

The language model plays an important role model is determining the probability space. For instance, in an English text, if the user types letter T and then strikes another location near letters Y, G and H, the English language model suggests that the letter H is the more likely letter to follow T (as in words "the", "there", "that", etc.) In FIG. 3, if the previous blob was determined as letter T, then if the current sequence of frames show the mapped to be near letter H, the language model process 346 is used to define a high probability space around letter H, that not only selects the left blob 312 over the right blob 314, but also favors the location of the left blob to be above the presumed location of letter H rather than any other neighboring locations representing letters Y and G.

Determining Object Shape for Resolving Ambiguity

Figure 4:
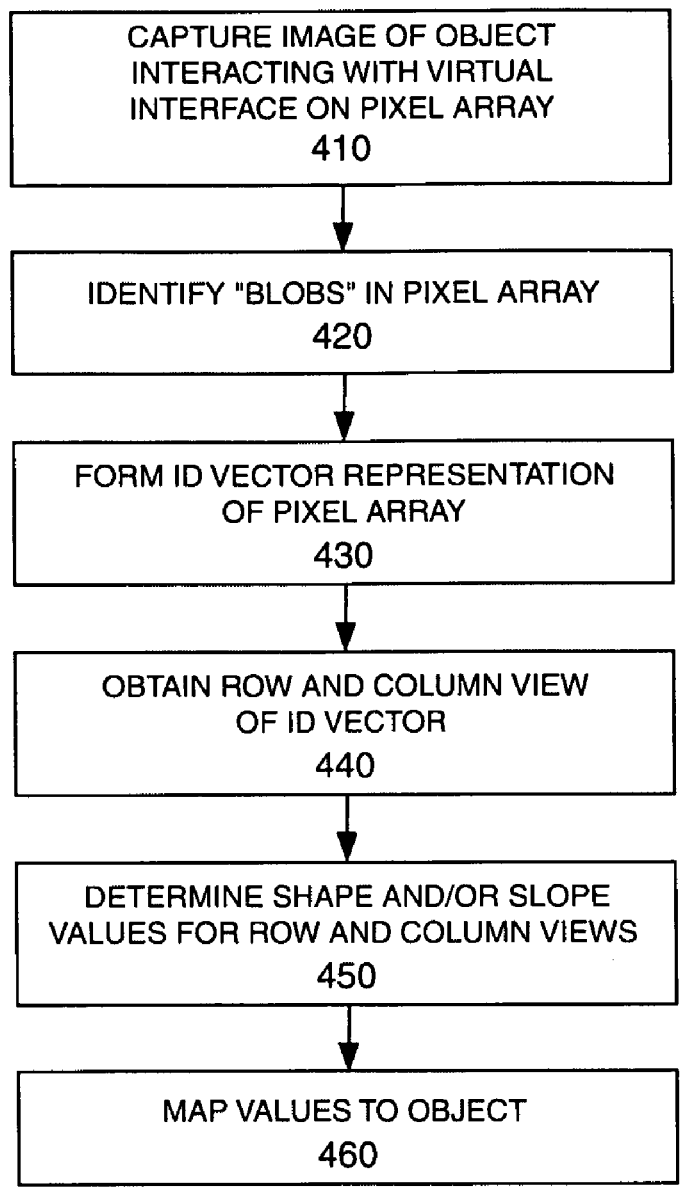
FIG. 4 illustrates a method for identifying a shape characteristic or feature of an object interacting with the virtual interface.

FIG. 4 illustrates a method for identifying a shape characteristic or feature of an object interacting with the virtual interface. As described, by determining the shape characteristic, it is possible to determine additional probability information indicating whether a particular key strike was intentional, as well as probabilities of various key values corresponding to the key strike. A method such as described in FIG. 4 may be performed as step 240 in FIG. 2. In addition, a method such as described with FIG. 4 may be performed by shape identification module 134 in FIG. 1.

Step 410 provides that an image of an object is captured as the object interfaces the virtual interface. The image may be captured on a pixel array.

In step 420, "blobs" (corresponding to clusters of pixels in the array having distinguishable intensity values) are identified. Each blob may be presumed to correspond to an object interacting with the virtual interface.

In step 430, an identification array is determined, where array values are assigned based on the intensity values of individual pixels in the image. Pixels where the blobs are present have higher intensity values.

Step 440 provides that a row view and a column view of the identification array is determined. The row view is determined by collapsing all of the columns. Specifically, each cell in a particular be summed, and the summed value represents that column. The column view is determined in a similar fashion from the identification array.

Step 450 provides that the shape and/or slope values of separate curves representing the row view and the column view are determined. In typical instances, the row and column values may be mapped as curves, and the slopes of ascent and descent of the views, as well as the distance between points on the ascent and descent of the curves, may be obtained.

The values determined in step 450 are mapped to particular objects in step 460. For example, the objects may correspond to finger tip, nail tip of a finger, a thick stylus, or a stylus point. In addition, one category may be "unknown".

Determining Displacement Characteristics

Figure 5:
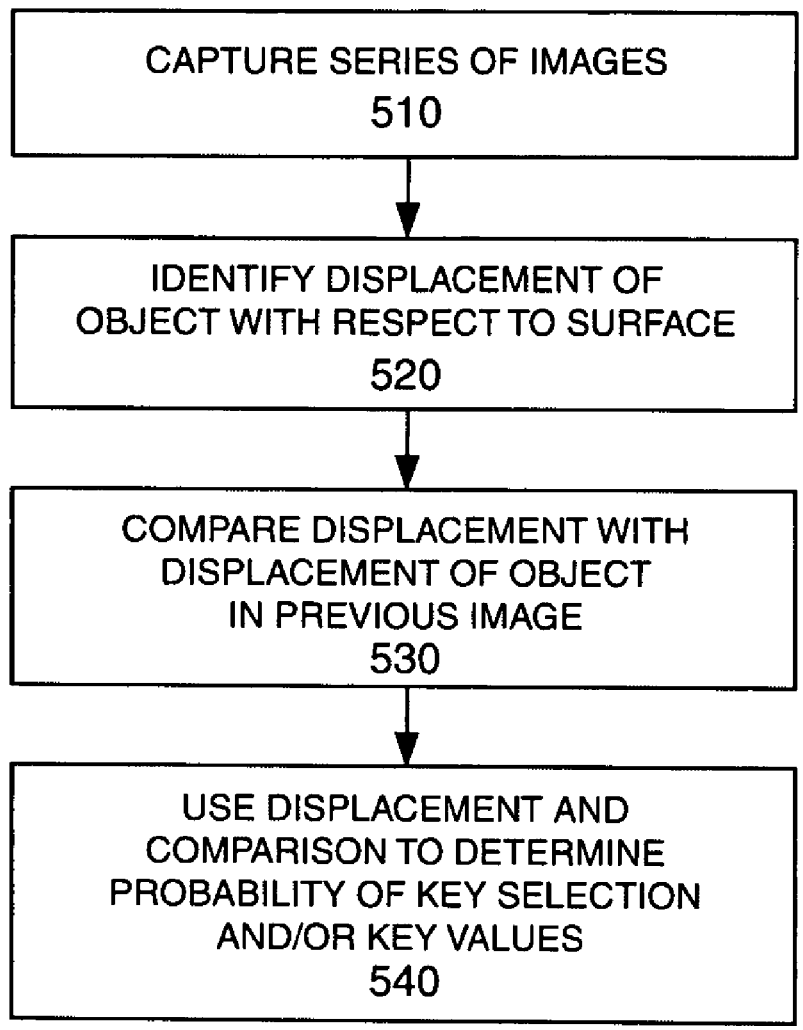
FIG. 5 illustrates a method for identifying a displacement characteristic or feature of an object interacting with the virtual interface.

FIG. 5 illustrates a method for identifying a displacement characteristic or feature of an object interacting with the virtual interface. As described, by determining the shape characteristic, it is possible to determine additional probability information indicating whether a particular key strike was intentional, as well as probabilities of various key values corresponding to the key strike. A method such as described in FIG. 5 may be performed as step 230 in FIG. 2. In addition, a method such as described with FIG. 4 may be performed by displacement module 136 in FIG. 1.

Step 510 provides that a series of images are captured of the virtual interface, where at least some of the images capture the object's interactions. Each image may be captured on a pixel array.

Step 520 provides that the displacement of an object with respect to the remainder of the surface is identified from one image. The displacement may correspond to how far the object is from the surface or region where the virtual interface is provided. This distance may be zero when the image is of the object making contact with the surface, or some other value when the image is of the object is just before the object makes contact with the surface.

As an optional step, step 530 may provide that the displacement identified in step 520 is compared with the displacement of an image corresponding to a previous time frame. In particular, the comparison may be of the immediately preceding time frame.

In step 540, the displacement of the object from step 520 and comparison information from step 530 are used to determine the probability that (i) an object's interaction with the virtual interface is intended to be a key selection (ii) probability values of different key values being the key value that corresponds to the most recent key strike.

A method such as described in FIG. 5 may be used in conjunction with one or more other processes such as described above. If, for example, the displacement or comparison steps indicate hovering or lingering fingers (assuming shape identification of a finger), the probability that the user's intention was to make a key selection is decreased. Likewise, grazing of one key value just before firmly selecting another key value may indicate that the first key value is to be ignored. Various other factors and combinations may be employed to select key values and probabilities of key values corresponding to key strikes when displacement characteristics and time variances of displacement characteristics are observed.

Using Historical Information For Determining Key Values

Embodiments of the invention employ historical key values in order to adjust probabilities that individual key values on a keyboard are assigned a current key value. In one embodiment, each key value is considered in a particular context, and a probability that a particular key value has been selected is based on the context. In an embodiment, the context is language, and previous key values are used to predict a current value. In particular, a technique provided herein uses layout information (the adjacent keys in question), and uses lexicographic information to determine probabilities for each key value being a current selected key value. The probabilities may be compared, so that key values with the highest probability values of being currently selected are identified.

Embodiments of the invention provide that the lexicographic information is obtained either through a table lookup of the most frequent n-grams in the target language or by parsing a dictionary which contains pre-fix suffix and syllable frequency information. For instance, in case of a digram (two letter frequency) implementation, if the previously typed letter was Q and the following letter falls on the boundary between the 'U'-key and the 'I'-key (who are adjacent on the QUERTY—keyboard layout), the algorithm would choose U as the correct key, because the letter sequence QU is much more common in the English language than the letter sequence QL.

For the implementation of a method provided by one embodiment, the n-grams and their corresponding probabilities based on their frequencies in the target language are stored in a table. The occurrence of each interaction that is to yield a current key value results in performance of an algorithm where k n-grams are constructed by concatenating the preceding n-1 typed letters and with each of the k ambiguous keys. For instance, if a key stroke falls on a boundary between the letter 'a' and the letter 'w' and the previously typed letter is a space, the algorithm constructs two digrams: 'space a' and 'space w'.

The algorithm then looks up the k digrams in a table and compares their probabilities. If the quotients of probabilities of the k digrams in question confirms a sufficient difference between the probabilities, the key with the highest probability is chosen as the key stroke to generate. Additionally, a heuristic based on the proximity of the key stroke to the core region of each ambiguous key can be introduced to determine the chosen key. If there is not a sufficient difference between the probabilities, the proximity to the core region can be used as the only measure to determine the key in question.

In an embodiment, a dictionary stored in a trie structure (a commonly known data structure based on the tree data structure) may be used. Additionally, each of the branches in the trie is assigned a probability based on the number of traversals during the construction of the dictionary. As the user types, the trie dictionary is traversed. Whenever an ambiguous key stroke occurs, each branch and its probability in the tree that leads to one of the k ambiguous keys is compared. If there is no branch, its assigned probability is zero. If there is sufficient difference between the probabilities (obtained through their ratios), the branch with the highest probability is taken. If there is not a sufficient difference, n-gram information can be used and if there is not sufficient n-gram information, the proximity to the core region can be used.

In an embodiment, a set of one or more key values are determined as having the highest probability of being the current key value. A probability value is assigned to each key value in the keyboard, with key values in the set indicating the highest values. The probability values are then compared to the probability values of the other processes. Methods such as described in this section may be performed using components described with, for example, historical determinative module 138 in FIG. 1.

Generating Sound to Indicate Off-Center Key Selection

Figure 6:
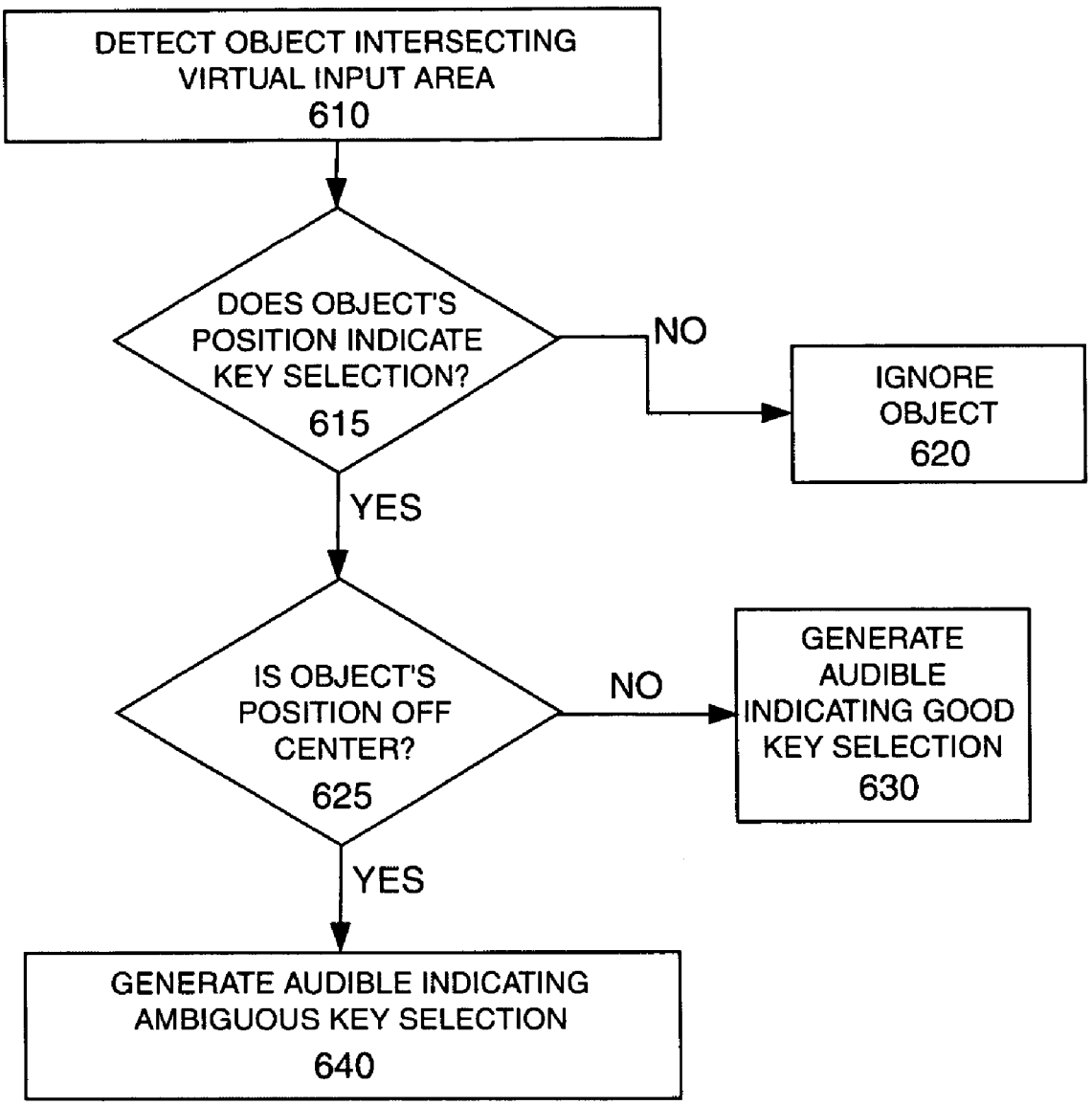
FIG. 6 illustrates a method for using sound as feedback during the operations of a virtual interface.

FIG. 6 illustrates a method for using sound as feedback during the operations of a virtual interface. A method such as described in FIG. 6 may be implemented using components such as described in FIG. 1. In one application, speaker 140 is part of the electronic device 150. For example, electronic device 150 may correspond to a PDA, which in most cases have a speaker to provide the user with audible feedback. A method such as described with FIG. 6 may also be used in conjunction with a method such as described in FIG. 2.

In step 610, an object intersecting the virtual input area is detected. This step may be performed in a manner similar to that recited for step 210 of FIG. 2.

In step 615, a determination is made as to whether the object's position indicates key selection. This may require determining that the object has in fact made contact with the surface 102. Furthermore, performance of this step may include completion of a method such as described in FIG. 2, where the probability indicators associated with the position, shape and/or velocity of the object indicate whether the object intersecting the input area is or is not a key selection.

If the determination in step 615 is that it is not a key selection, then step 620 provides that the object is ignored.

Otherwise, if the determination is that the object's intersection of the input area is a key selection, then step 625 provides that a determination is made as to whether the object's position is off-center relative to a center of a most proximate key 124.

If the determination in step 625 is that the object was centered relative to the particular key 124, then step 630 provides that a first sound is generated indicating a centered key selection. The first sound may also inform the user that there was little ambiguity in determining what keystroke was to be assigned to the object intersecting the input area.

If the determination in step 625 is that the object was off-center relative to the particular key 124, step 640 provides that a second sound is generated that informs the user that the object intersected the input area off-center relative to the most proximate key. The second sound may also correspond to informing the user that there was ambiguity in determining what keystroke was to be assigned to the object intersecting the input area.

In an embodiment, the first sound and the second sound are distinguishable from one another. Specifically, the first sound and the second sound may be of different harmonics, volume, or pattern.

In the case of virtual interfaces such as light-generated keyboards, it is assumed that users will, on occasion, stray from the keys that they intend to select, particularly since such keyboards offer no physical presence and no tactile feedback. Thus, ambiguous key strokes may occur when a finger falls on a boundary between two or more keys of the light-generated keyboard, or is otherwise on the outer boundary of a single key. As described herein, such ambiguous keystrokes may be provided a distinct audible feedback. In one embodiment, multiple distinct audible feedbacks may be provided, depending on different factors, such as the degree of ambiguity or the location of the ambiguous selection. Additionally, an embodiment provides that different types of keys can be identified by different sounds, and further that mode changes can be signaled by a different sound for all effected keys.

Figure 7A:
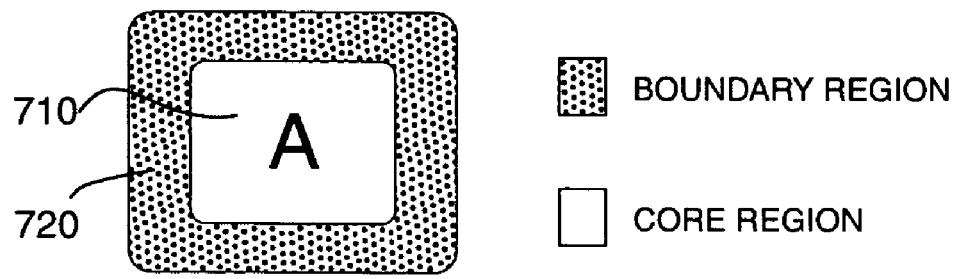
FIGS. 7A and 7B illustrate different manners in which a key on the keyboard can be delineated, under an embodiment of the invention.

FIG. 7A illustrates one manner in which a key 124 on keyboard 122 can be delineated into distinct regions for purpose of indicating when a user's interaction with that key is to be deemed an ambiguous key selection. As shown by FIG. 7A, the key 124 is separated into a core region 710, and a boundary region 720. The boundary region 720 includes a perimeter section of the key 124, while the core region 710 is interior with respect to the boundary region. A different sound is assigned to each region. As the user touches the region of surface 102 (FIG. 1) corresponding to that key, a different sound is generated, depending on whether the user's contact with the region of the surface corresponds primarily to core region 710 or boundary region 720. The sound generation gives the user feedback as to where he touched each key and teaches him/her to focus on placing the fingers in the middle of each key, so that ambiguous key entries are avoided.

Figure 7B:
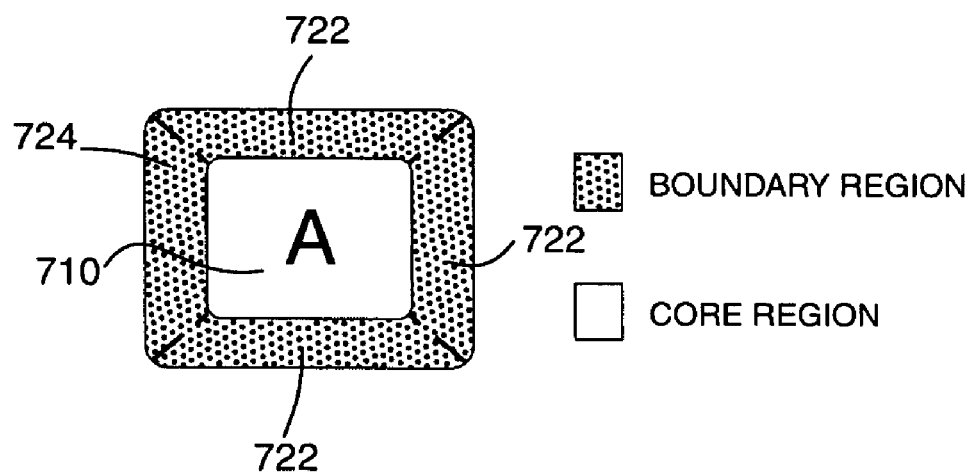

FIG. 7B illustrates a similar embodiment, except that multiple boundary regions 722, 724 are assigned to each key 124. The particular sound generated as a result of the user's contact corresponding to each of the boundary regions 722, 724 or core region 710 may be distinct to indicate (i) the keystroke was sufficiently off-center to be ambiguous, and (ii) the keystroke was off-center left/right or up/down. The overall boundary region may be assigned two or more distinctly identifiable sounds to indicate the direction of the ambiguity for the off-center keystroke.

In one embodiment, the boundaries of keyboard 122 are defined in a layout table that gives the upper left corner and lower right corner coordinates of each key 124. When the user touches a region of the surface 102 corresponding to a key, the coordinate of the touch point in determined in the same coordinate system as used to define the key regions. When the user touches a key within the key boundary, a key event is generated. Each key event is reported as a tuple <keycode, regionid>, where the key-code is the usual escape code for the key, and regionid determines which region within the key was touched. Since a touch typically covers an area that may fall both on the core or boundary, a heuristic may be used to determine an appropriate regionid value. For instance, the heuristic may state that if a touch falls more than 50% in core region, then, the regionid will specify the core region. Otherwise, the regionid refers to (one of) the boundary region(s). When a host driver receives the key event, it will report the key-code to the application, and chooses a sound clip based on the regionid value. Clearly, the sound clip is chosen such that an approving sound is played when the core region is pressed, and a warning or at least a distinct sound is played when the boundary region (or one of the boundary regions) is pressed (touched). The core region sounds and the boundary region sounds can be harmonics of each other or simply the same sound with a different volume. Based on the audio feedback, the user can learn to hit the center of the keys without having to look at the keyboard.

In one embodiment, distinct sounds can be used to differentiate between modifier keys (such as alt, ctrl), alphanumeric keys and non-alphanumeric keys (such as caps lock, enter, backspace, delete). This will provide additional clues to signal the user whether correct keys are being hit during the typing process. Since traditional keyboard layouts such as the Dvorak layout are bounded by non-alphanumeric keys, the distinct sounds additionally prevent the user from straying from correct keys during the typing process. Modifier key sounds provide additional clues if the user inadvertently hits one of the modifier keys while providing assurance that the correct key was hit in the intentional case.

In another embodiment, when the keyboard is in a special mode, as is for instance the case when the caps lock is activated, a distinct sound is heard when the user hits an effected key. Such an embodiment reduces the number of unintended mode changes and the number of keys placed while an unintended mode is active. Similarly, in implementations where key regions to activate mouse buttons are used, the engagement of the mouse buttons can similarly trigger a distinct sound.

A method such as described by FIGS. 6, 7A and 7B has the potential to increase user satisfaction and efficiency when virtual keyboards and similar interfaces are in use. While on a mechanical keyboard, the finger is guided to touch the center of each key by slightly elevated key edges, this system provides similar guidance with sound, preventing that the user has to take off his eyes from the transcribed text more than necessary. An embodiment such as described can also used to decrease error rates since the user is immediately alerted when s/he strays off the key core region or does not hit the intended key.

While embodiments described above rely mostly on position information to determine the particular sound that is to correspond to a key stroke, other embodiments may correlate the sound emitted with a confidence rating of the key stroke. The confidence rating may correspond to or be based on the probability values determined with methods such as described with FIG. 2. Specifically, if the most probably key value in response to a key selection is uncertain, then the sound may reflect a weak confidence rating for that key selection. Likewise, if the key strike is ambiguous as to whether it was intentional, a similar distinguishing sound or warning may be emitted. Variations and modifications that relate confidence rating to the sound emitted in response to a key stroke are possible.

Hardware Diagram

FIG. 8 illustrates a hardware diagram of a system 810 upon which an embodiment of the invention may be implemented. The system 810 includes a processor 830 and a memory 835. The memory 835 may hold programs, software or instructions for executing embodiments and processes such as described herein. The processor 830 may access the instructions from the memory 835 in order to execute methods and processes such as described.

A combination of a camera 824 and a laser 828 form a position sensor 820. The position sensor 820 (similar to that described in FIG. 1) obtains depth information of an object interacting or intersecting with the surface e 802. The surface 802 may correspond to where the virtual interface is provided. The laser 828 may direct structured light across the scene 802. When the object intersects the structured light, camera 824 captures the image of the reflection. The structured light and reflection may be infrared or other invisible light, and not visible light such as provided by the projector 120 of FIG. 1. From the image of the reflection, the position of the object may be determined. The position may include the depth of the object from the camera 824. In one embodiment, depth-wise coordinate information may be obtained by directing one beam from laser 828 across scene 802, and then measuring a thickness of the image of the beam reflecting off of the object. In another embodiment, the depth-wise coordinate information may be obtained by directing two beams from laser 828 across scene 802, and then measuring a separation distance of the two beams in the image of the reflection. Both of the aforementioned techniques are described in greater detail in the following U.S. Patent applications:. (1) Ser. No. 10/246,123, filed Sep. 17, 2002, originally entitled "Method and Apparatus for Approximating Depth of an Object's Placement Onto a Monitored Region With Applications to Virtual Interface Devices," and (2) Ser. No. 10/245,925, filed Sep. 17, 2002, originally entitled "Method and Apparatus for Approximating Depth of an Object's Placement Onto a Monitored Region With Applications to Virtual Interface Devices." The aforementioned applications are hereby incorporated by reference for all purposes. Another technique for identifying depth information and other coordinates of an object in a scene (such as on or near surface 102 where keyboard 122 is provided) using pixel analysis is described in U.S. patent application Ser. No. 09/502,499, the aforementioned application being hereby incorporated by reference for all purposes in its entirety.

Many other sensing techniques exist for implementing position sensor 820. Such methods include systems based on the measurement of the time it takes for light emitted from near the sensor to reach the object of interest and bounce back to the sensor, as well as active triangulation systems, in which the object approaching the surface intersects a beam of light that substantially grazes the surface, and a camera out of the plane observes the bright spots formed by these intersections.

Processor 80 obtains pixel values, or other raw data provided by sensor 820 in order to determine the position information. The camera 824 may also provide other image information for performing other processes, such as data for determining the shape of the object and the displacement characteristic of the object. Instructions for performing the processes described above may be retrieved from memory 835 in order to determine probability values. These probability values may indicate the likelihood that a particular key stroke was intentional, as well as which keys were likely intended to be entered. The probability values may be sent through port 840 to another electronic device 150 (FIG. 1).

In addition, processor 830 may output sound values to a speaker 855. The sound values may be determined from either the probability values, or from position information. An example of the latter case would be if the position information indicates that the key strike was off-center on a particular key. On the other hand, if probability values indicate uncertain key values, the sounds generated by processor 830 may reflect the uncertainty. Lastly, the sounds outputted by the processor 830 may also be distinguishable based on the particular key value that is most probably. For example, "shift" or "alt" keys in a standard QWERTY arrangement may be given different sound values than alphabet keys.

While certain aspects of the invention are presented below in certain claim forms, the inventors contemplates the various aspects of the invention in any number of claim forms. Accordingly, the inventors reserve the right to add additional claims after filing the application to pursue such additional claim forms for other aspects of the invention.

What we claim is:

1. A method for determining which key value in a set of key values is to be assigned as a current key value as a result an object intersecting a region where a virtual interface for enabling selection of individual key values in the set of key values is provided, the method comprising:
   determining a position of where the object intersects the region using, at least in part, a depth sensor that determines a depth of the position in relation to a position of the depth sensor;
   identifying a set of one or more historical key values that are pertinent to the current key value;
   determining at least one of (i) a displacement characteristic of the object or (ii) a shape characteristic of object; and
   indicating a probability that the current key value is a particular one or more of the key values in the set of key values based on the position, the set of one or more historical key values, and the at least one of the displacement characteristic or the shape characteristic.

2. The method of claim 1, wherein the step of indicating a probability that the current key value is a particular one or more of the key values in the set of key values includes indicating, for each particular key value in the set of key values, that the particular key value is the current key value.

3. The method of claim 2, wherein the step of indicating a probability that the current key value is a particular one or more of the key values in the set of key values includes providing an external electronic device with data corresponding to the likelihood that each key value in the set of key values is the current key value.

4. The method of claim 1, further comprising the step of providing the virtual interface by providing a light-generated keyboard over a surface, and monitoring a portion of the surface where the light-generated keyboard is provided in order to detect contact between any object and the surface.

5. The method of claim 4, wherein the step of identifying a set of one or more historical key values includes using one or more key values that were indicated as being the current value in one or more previous instances.

6. The method of claim 1, further comprising the step of detecting that the object has intersected the region, and wherein the step of determining a position includes determining that the position of the object is near or on a boundary of one or more designated area in the region, wherein each designated area delineates one of the key values in the set of key values.

7. The method of claim 1, wherein determining a displacement characteristic includes determining a displacement of the object in relation to a surface of the region where the virtual interface is provided.

8. The method of claim 5, wherein the step of using one or more key values that were indicated as being the current value in one or more previous instances includes using alphabet characters from the keyboard that were indicated as being the current key values in the one or more previous instances.

9. The method of claim 1, wherein the step of using alphabet characters includes using lexicographic information.

10. The method of claim 1, wherein the step of determining the shape characteristic includes determining whether a shape of the object corresponds to any one of a stylus or a finger.

11. The method of claim 10, wherein the step of determining the shape characteristic includes determining whether a shape of the object corresponds to any one of a stylus tip, finger tip, or unknown shape.

12. An electronic device for providing a virtual interface, the electronic device comprising:
   a position sensor configured to determine a position of an object that has intersected a region where the virtual interface is provided, where the position includes at least one coordinate that is based on a depth of the object from the sensor; and
   a processor configured to:
      identify a set of one or more historical key values that are pertinent to the current key value;
      determine at least one of (i) a displacement characteristic of the object or (ii) a shape characteristic of object; and
      indicate a probability that the current key value is a particular one or more of the key values in the set of key values based on the position, the set of one or more historical key values, and the at least one of the displacement characteristic or the shape characteristic.

13. The electronic device of claim 12, wherein the processor is configured indicate, to for each particular key value in the set of key values, that the particular key value is the current key value.

14. The electronic device of claim 12, wherein the processor is configured to provide an external electronic device with data corresponding to the likelihood that each key value in the set of key values is the current key value.

15. The electronic device of claim 12, further comprising a light-source configured to project a light-generated keyboard over a surface, and wherein the position sensor is configured to monitor a portion of the surface where the light-generated keyboard is provided in order to detect contact between any object and the surface.

16. A method for providing feedback as to an input selected by a user through an input interface, the method comprising:
   detecting that an object intersects an area where the input interface is provided;
   determining a position of the object when the object intersects the area;
   identifying a set of one or more possible input selections corresponding to the contact based at least in part on the position, including at least a first input selection in the set that is identified as corresponding to the contact between the object and the surface;
   determining a probability indication for at least the first input selection;
   generating a first sound to indicate that the probability indication for at least the first input selection is below a threshold level, the probability indication indicating that the identification of at least the first input selection is ambiguous.

17. The method of claim 16, further comprising the step of determining a second position of the object when the object intersects the area a second time, and generating a second sound to indicate that the probability indication for at least the second input selection is below the threshold level.

18. The method of claim 17, wherein the first sound and the second sound have a similar harmonic.

19. The method of claim 17, wherein determining a probability indication for at least the first input includes determining at least one of (i) a displacement characteristic of the object or (ii) a shape characteristic of object.

20. The method of claim 17, wherein determining a shape characteristic of object includes distinguishing the object as being one of a stylus, a finger, or something else.

* * * * *